April 22, 1952  N. GRANGER  2,594,011
FISHING LINE HOOK PROTECTOR
Filed Nov. 14, 1949
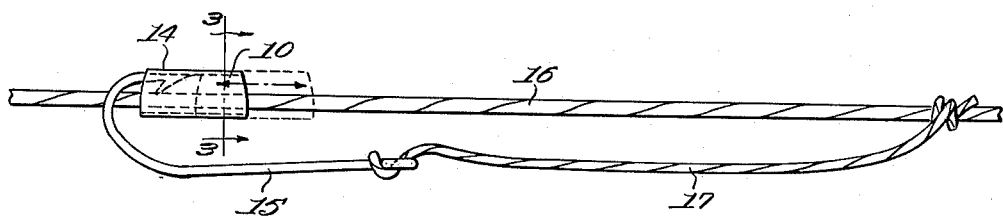
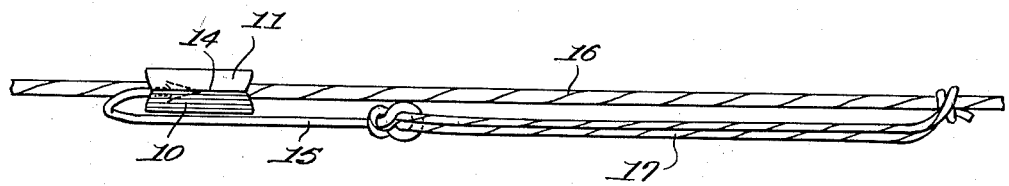
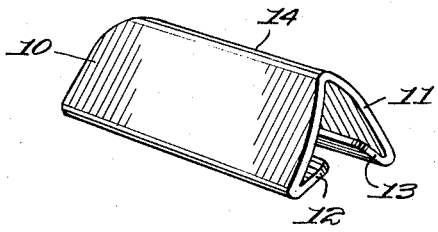
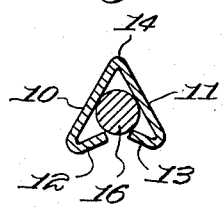
INVENTOR.
Noah Granger;
BY Victor J. Evans & Co.
ATTORNEYS Patented Apr. 22, 1952

2,594,011

UNITED STATES PATENT OFFICE 2,594,011

FISHING LINE HOOK PROTECTOR

Noah Granger, Lake Charles, La.

Application November 14, 1949, Serial No. 126,961

1 Claim. (Cl. 43—43.4)

This invention relates to fishing tackle particularly for use with fishing lines having a plurality of hooks thereon and where the lines are reeled without removing the hooks, and in particular the invention relates to a thin metal shield or clip adapted to be positioned on a fishing line into which the point of a fish hook is inserted when not in use whereby the line may be wound on a reel or spool with a plurality of hooks thereon.

The purpose of this invention is to provide means for temporarily holding points of fish hooks on fishing lines to facilitate handling the lines with the hooks attached thereto.

It is sometimes desirable, particularly when using trot lines where a plurality of hooks are attached to a single line, to retrieve the line and wind it on a reel or spool without removing the hooks and for this use hooks have been inserted in corks or other holding elements and by these devices it is difficult to hold the hook along the line. With this thought in mind this invention contemplates a small metal clip that may readily be bent over a fishing line with the point and barb of a fish hook positioned therein for temporarily holding the hook to the line.

The object of this invention is, therefore, to provide a fish hook attaching clip for temporarily holding the point of a fish hook to a line.

Another object of the invention is to provide a shield or clip for temporarily holding the point of a fish hook in position on a fishing line to facilitate winding the line on a reel without disconnecting the hook from the line.

A further object of the invention is to provide a fish hook point protector and clamp or clip for temporarily holding the point of a fish hook to a line which is of a simple and economical construction.

With these and other objects and advantages in view the invention embodies a comparatively thin metal shield or clip, V-shaped in cross section with the lower or open edges crimped inwardly.

Other features and advantages of the invention will appear from the following description taken in connection with the drawings wherein:

Figure 1 is a side elevational view showing the clip in the position of holding the point of a fish hook to a line.

Figure 2 is a plan view looking toward the vertex of the V-shaped clip and also showing the clip in the position of holding a fish hook to the line.

Figure 3 is a cross section through the clip and line taken on line 3—3 of Figure 1.

Figure 4 is a view illustrating the design and construction of the clip.

Referring now to the drawings wherein like reference characters denote corresponding parts the improved fish hook retaining clip of this invention is formed with a thin piece of sheet metal having sides 10 and 11 with the edges of the sides provided with inwardly extended flanges 12 and 13, respectively and with the sides connected at the vertex or point 14.

The clips are provided as shown in Figure 4, and particularly when using a trot line where a plurality of hooks 15 are used on one line, the clips are positioned on the line 16 in spaced relation to the hooks which are held by leaders 17, and as the line is retrieved the barbs and points of the hooks are inserted in the clips.

By this means the hooks may be held to the line by the clips and as the line is retrieved and rolled on a reel or spool the line may be stored with the clips holding the hooks thereto.

It will be understood that modifications may be made in the design and arrangement of the parts without departing from the spirit of the invention.

What is claimed is:

In a fishing hook protector, the combination which comprises a fishing line, a hook carried by a leader extended from the fishing line, and a clip of thin sheet material substantially V-shaped in cross section having sides connected at one of the edges thereof and having inwardly extended flanges on the outer edges mounted on the fishing line and positioned with the said inwardly extended flanges in gripping relation with the line whereby the vertex of the clip provides an opening for receiving the point of a fishing hook carried by the leader.

NOAH GRANGER.

REFERENCES CITED

The following references are of record in the file of this patent:

UNITED STATES PATENTS

| Number | Name | Date |
|---|---|---|
| 1,879,991 | Pratt | Sept. 27, 1932 |
| 2,389,897 | Davis | Nov. 27, 1945 |
| 2,398,504 | Pavelka | Apr. 16, 1946 |
| 2,514,110 | Warren | July 4, 1950 |